(12) United States Patent
Folkman (10) Patent No.: US 9,697,576 B2
(45) Date of Patent: Jul. 4, 2017

(54) MITIGATING UNAUTHORIZED CONTENT CLAIMS

(71) Applicant: ZEFR, Inc., Venice, CA (US)

(72) Inventor: Brandon Folkman, Venice, CA (US)

(73) Assignee: ZEFR, Inc., Venice, CA (US)

( * ) Notice: Subject to any disclaimer, the term of this patent is extended or adjusted under 35 U.S.C. 154(b) by 681 days.

(21) Appl. No.: 14/151,399

(22) Filed: Jan. 9, 2014

(65) Prior Publication Data

US 2015/0193894 A1 Jul. 9, 2015

(51) Int. Cl.
*G06F 21/00* (2013.01)
*G06Q 50/18* (2012.01)
*G06F 21/10* (2013.01)

(52) U.S. Cl.
CPC .......... *G06Q 50/184* (2013.01); *G06F 21/10* (2013.01); *G06F 2221/2141* (2013.01)

(58) Field of Classification Search
CPC .......................... G06F 21/10; G06F 2221/2141
See application file for complete search history.

(56) References Cited

U.S. PATENT DOCUMENTS

| | | | | |
|---|---|---|---|---|
| 8,788,334 B2* | 7/2014 | Rose | ...................... | G06Q 30/02 705/14.4 |
| 2006/0026044 A1* | 2/2006 | Smith | ..................... | G06Q 40/08 705/4 |
| 2008/0082381 A1* | 4/2008 | Muller | ................. | G06Q 20/145 705/344 |
| 2009/0157490 A1* | 6/2009 | Lawyer | ................ | G06Q 10/063 705/59 |
| 2012/0122429 A1* | 5/2012 | Wood | .................... | H04L 63/102 455/414.1 |
| 2012/0216236 A1* | 8/2012 | Robinson | ................. | H04N 7/16 725/118 |
| 2013/0117160 A1* | 5/2013 | Potash | .................... | G06Q 30/06 705/27.1 |
| 2013/0132727 A1* | 5/2013 | Petrovic | ............. | H04N 21/4627 713/176 |
| 2013/0132852 A1* | 5/2013 | Sommer | ............. | G06Q 10/103 715/736 |
| 2013/0152211 A1* | 6/2013 | Wu | ........................ | G06F 21/10 726/26 |
| 2013/0283306 A1* | 10/2013 | Rao | ................... | G06F 17/30696 725/14 |

(Continued)

OTHER PUBLICATIONS

Meeyoung Cha et al., Analyzing the Video Popularity Characteristics of Large-Scale User Generated Content Systems, Oct. 2009, IEEE/ACM, vol. 17 Issue 5, pp. 1357-1370.*

(Continued)

*Primary Examiner* — Kari Schmidt
*Assistant Examiner* — Fahimeh Mohammadi
(74) *Attorney, Agent, or Firm* — Kunzler Law Group (57) ABSTRACT

For mitigating unauthorized content claims, an identification module ranks a plurality of content according to a value policy. The plurality of content is provided through a content host. Each content item of the plurality of content is associated with at least one authorized claimant. The identification module further identifies an unauthorized claim for a content item of the plurality of content by an unauthorized claimant. A mitigation module mitigates the unauthorized claim.

10 Claims, 8 Drawing Sheets

(56) References Cited

U.S. PATENT DOCUMENTS

2014/0283123 A1* 9/2014 Lonstein ................. H04L 63/10
                                                          726/28
2015/0030200 A1* 1/2015 Petrovic ................ G06T 1/0028
                                                         382/100
2015/0363478 A1* 12/2015 Haynes ................ G06Q 10/101
                                                         707/625

OTHER PUBLICATIONS

Meeyoung Cha et al., I Tube, You Tube, Everybody Tubes: Analyzing the World's Largest User Generated Content Video System, Oct. 24-26, 2007, ACM, pp. 1-14.*
Fabricio Benevenuto et al., Understanding Video Interactions in YouTube, Oct. 26-31, 2008, ACM, pp. 761-764.*
Xu Cheng et al., Statistics and Social Network of YouTube Videos, Jun. 2-4, 2008, IEEE, pp. 229-238.*

* cited by examiner

| Content ID 210 |
|---|
| Content Title 215 |
| Content Source 220 |
| View Statistics 225 |
| Authorized Claimant 230 |
| Unauthorized Claimant 235 |
| Claimant Log 240 |
| Content Hash 245 |
| Mitigation Log 250 |
| Claim Status 255 |
| View Rank 260 |

| Title 705 | Source 710 | Views 715 | Unauthorized Claimant 720 | Mitigation Status 725 | Type 730 | Mitigation Action 735 |
|---|---|---|---|---|---|---|
| Title 705 | Source 710 | Views 715 | Unauthorized Claimant 720 | Mitigation Status 725 | Type 730 | Mitigation Action 735 |
| Title 705 | Source 710 | Views 715 | Unauthorized Claimant 720 | Mitigation Status 725 | Type 730 | Mitigation Action 735 |
| Title 705 | Source 710 | Views 715 | Unauthorized Claimant 720 | Mitigation Status 725 | Type 730 | Mitigation Action 735 |

MITIGATING UNAUTHORIZED CONTENT CLAIMS

BACKGROUND

Field

The subject matter disclosed herein relates to unauthorized content claims and more particularly relates to mitigating unauthorized content claims.

Description of the Related Art

Content hosts such as YOUTUBE® often host content that is posted and/or claimed by a party that is not an authorized owner of the content, resulting in unauthorized claims for the content. These authorized claims diminish revenue and other benefits to authorized claimants.

BRIEF SUMMARY

A method for mitigating unauthorized content claims is disclosed. An identification module ranks a plurality of content according to a value policy. Each content item of the plurality of content is associated with at least one authorized claimant. The plurality of content is provided through a content host. The identification module further identifies an unauthorized claim for a content item of the plurality of content by an unauthorized claimant. A mitigation module mitigates the unauthorized claim. An apparatus and program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing computer readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in computer readable code and/or software for execution by various types of processors. An identified module of computer readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a computer readable signal medium or a computer readable storage medium. The computer readable storage medium may be a storage device storing the computer readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable code embodied therein, for example, in baseband or as part of a carrier wave.

Such a propagated signal may take any of a variety of forms, including, but not limited to, electro-magnetic, optical, or any suitable combination thereof. A computer readable signal medium may be any storage device that is not a computer readable storage medium and that can communicate, propagate, or transport a program for use by or in connection with an instruction execution system, apparatus, or device. Computer readable code embodied on a storage device may be transmitted using any appropriate medium, including but not limited to wireless, wire line, optical fiber cable, Radio Frequency (RF), etc., or any suitable combination of the foregoing.

Computer readable code for carrying out operations for embodiments may be written in any combination of one or more programming languages, including an object oriented programming language such as Java, Smalltalk, C++ or the like and conventional procedural programming languages, such as the "C" programming language or similar programming languages. The computer readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by computer readable code. These computer readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The computer readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable code.

Descriptions of Figures may refer to elements described in previous Figures, like numbers referring to like elements.

Figure 1:
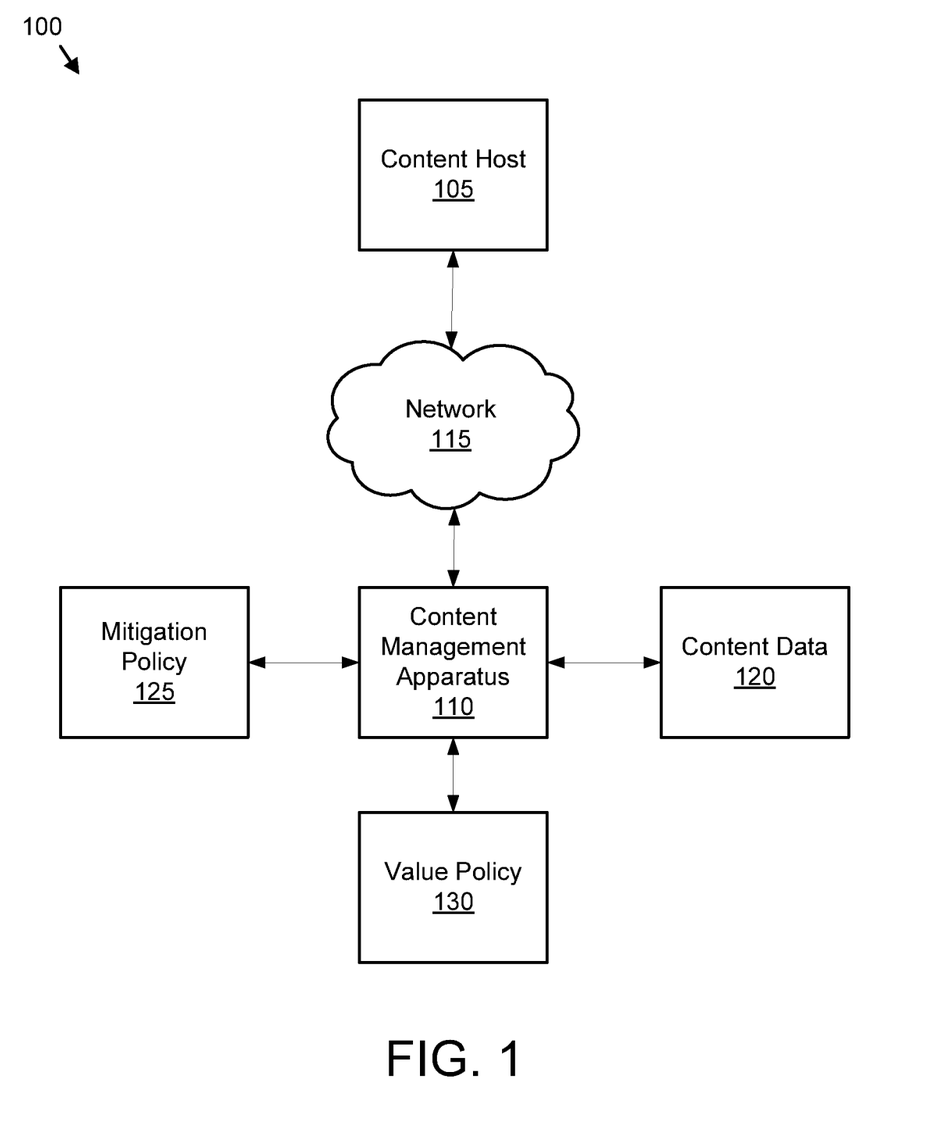
FIG. 1 is a schematic block diagram illustrating one embodiment of a content system.

FIG. 1 is a schematic block diagram illustrating one embodiment of a content system 100. The content system 100 includes a content host 105, a content management apparatus 110, content data 120, a mitigation policy 125, a value policy 130, and a network 115.

The content host 105 may receive submissions of content. The content host 105 may then store the content and provide the content to users through the network 115. In one embodiment, the content is available to general public users. In alternate embodiments, access to the content is restricted to member users.

The content host 105 may receive submissions of content without verifying that the submitters of the content have legal rights to distribute the content through the content host 105. When content is submitted to the content host 105 that infringes copyrights and other intellectual property rights, the content host 105 is required by the Digital Millennium Copyright Act in the United States and similar legislation in other jurisdictions to block access to the infringing content when notified of the infringement by an authorized claimant that owns rights to the content.

However, many authorized claimants elect to allow access to the infringing content to continue and instead claim the revenue and other benefits from the infringing content. In order to claim the infringing content, the authorized claimant simply communicates a claim for the content to the content host 105.

Unfortunately, such simple mechanisms for blocking content and/or claiming content on the content host 105 can also be used by unauthorized claimants to usurp the legitimate rights of authorized claimants. As a result, unauthorized claimants may not only submit infringing or unauthorized content, but the unauthorized claimants may also claim both authorized and unauthorized content, to the detriment of authorized claimants.

The embodiments described herein rank a plurality of content according to the value policy 130, as will be described hereafter. In addition, the embodiments identify an unauthorized claim for a content item of the plurality of content by an authorized claimant and mitigate the unauthorized claim according to the mitigation policy 125 as will be described hereafter.

Figure 2A:
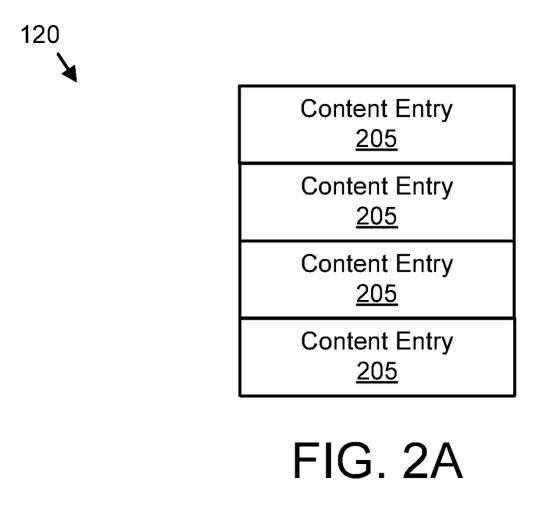
FIG. 2A is a schematic block diagram illustrating one embodiment of content data.

FIG. 2A is schematic block diagram illustrating one embodiment of content data 120. The content data 120 may be organized as a database, linked data structures, a flat file, or combinations thereof that is stored in a memory. In one embodiment, the content data 120 includes a plurality of content entries 205. A content entry 205 may be stored in the content data 120 for each content item of content that is managed with the content management apparatus 110. The content item stored in the content data 120 may include but is not limited to authorized content that is submitted by an authorized claimant, authorized content that is claimed both by an authorized claimant and an unauthorized claimant, unauthorized content that is submitted by an unauthorized claimant, unauthorized content that is claimed by the authorized claimant, and the like.

Figure 2B:
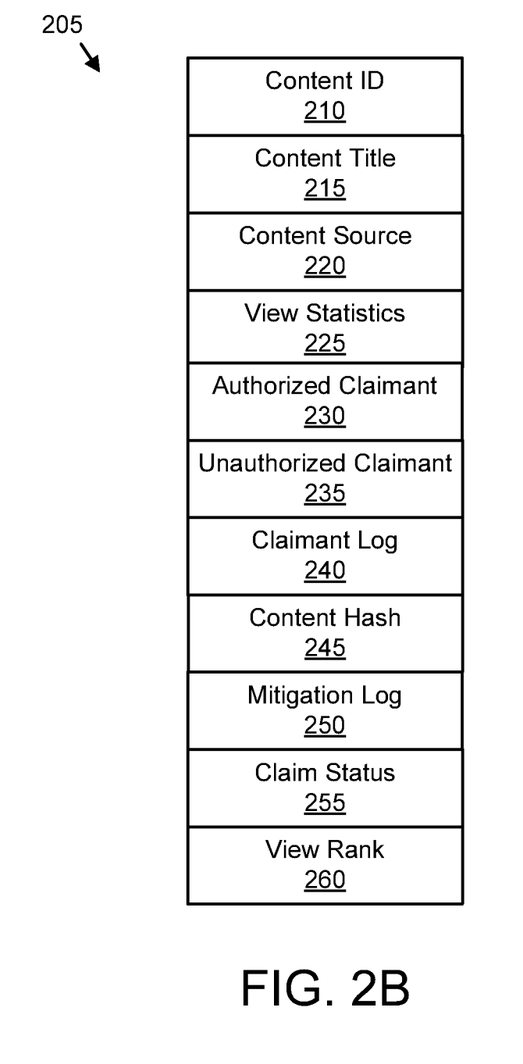
FIG. 2B is a schematic block diagram illustrating one embodiment of a content entry.

FIG. 2B is a schematic block diagram illustrating one embodiment of a content entry 205 of FIG. 2A. The content entry 205 includes a content identifier 210, a content title 215, a content source 220, view statistics 225, an authorized claimant 230, an unauthorized claimant 235, a claimant log 240, a content hash 245, a mitigation log 250, a claim status 255, and a view rank 260.

The content identifier 210 may uniquely identify a content item within the content provider 105. In one embodiment, the content identifier 210 comprises a portion of a Universal Resource Locator (URL). Alternatively, the content identifier 210 may comprise an index value.

The content title 215 may describe the content item. The content title 215 may be downloaded from the content host 105, provided by the authorized claimant, or combinations thereof.

The content source 220 may identify the source of the content item. The content source 220 may identify one or more of the content host 105, search query terms used to retrieve the content item, a channel of the content host 105, an identifier of the submitter of the content item, a submission time, a source Internet address, and the like.

The view statistics 225 may comprise data on accesses to the content item. As used herein, accesses to content are referred to as views. The view statistics 225 may include a total number of views for the content item. In addition, the view statistics 225 may include a number of views for the content item at various times. For example, the number of views for the content item may be regularly retrieved after a specified retrieval time interval. The number of views for each retrieval time interval and the time of the retrieval may be stored in the view statistics 225.

In one embodiment, the view statistics 225 comprise data on revenue from the content item. The view statistics 225 may include a total revenue from the content item. In addition, the view statistics 225 may include the revenue for each retrieval time interval and the time of the retrieval.

In one embodiment, view statistics 225 comprise data on inclusions of the content item in search results. For example, the view statistics 225 may record times that the content item was returned as part of search results. In addition, the view statistics 225 may record the search query terms used to retrieve the content item.

The view statistics 225 may further comprise link data for the content item. The link data may include content that is linked to the content item, views for the linked content, revenue for the linked content, content claimants for the linked content, and the like.

The authorized claimant 230 may specify an entity and/or individual that is one or more of a legal owner, a legal agent, a legal manager, a legal licensee, or the like of the content item. In one embodiment, the authorized claimant 230 is only recorded in response to receiving proofs of a legitimate claim to the content item. The authorized claimant 230 may further comprise the proofs of the legitimate claim.

In one embodiment, the authorized claimant 230 further includes payment transfer information for facilitating payments from the content host 105 for the content item. In addition, the authorized claimant 230 may include registration information including copyright registrations, trademark registrations, the identities of persons appearing within the content item, and the like.

The unauthorized claimant 235 may include an identifier for each claimant of the content item that is not an authorized claimant 230 and that has claimed the content item at the content host 105. In one embodiment, the identifier of the unauthorized claimant 235 is the identifier assigned by the content host 105.

The information for the unauthorized claimant 235 may be retrieved from the content host 105. Additional information including a legal name of an individual and/or entity, a mailing address, an email address, telephone number, responses, and the like may also be recorded for the unauthorized claimant 235.

The claimant log 240 may record each claim to the content item on the content host 105. For each claim, the claimant log 240 may record an identifier for the claimant, the time of the claim, and a status of the claim. The claimant log 240 may record claims by unauthorized claimants 235. In addition, the claimant log 240 may record claims by authorized claimants 230.

The content hash 245 may be a hash of the content item. The content hash 245 may identify the content item. In one embodiment, the content hash 245 is used to find and confirm instances of the content item on the content host 105. For example, a potential content item may be retrieved from the content host 105. The potential content item may be compared with the content hash 245 to determine whether the potential content item is equivalent to the content item. Alternatively, the content hash 245 may be used to determine if a potential content item includes a portion of the content item.

The mitigation log 250 may record mitigation actions against unauthorized claimants 235. Mitigation actions may include but are not limited to notifying the unauthorized claimant 235, notifying the content host 105, and combinations thereof. The mitigation log 250 may also record the results and responses of each mitigation action. For example, the mitigation log 250 may record if a claim to the content item by an unauthorized claimant 235 is successfully removed from the content host 105.

In one embodiment, the mitigation log 250 records a time of the mitigation action. In addition, the mitigation log may record a time of the mitigation result. In a certain embodiment, the mitigation log 250 records an initiator of the mitigation action. The initiator of the mitigation action may be an administrator. Alternatively, the initiator of the mitigation action may be the mitigation policy 125.

The claim status 255 may include a current status of claims to the content item. In one embodiment, the claim status 255 identifies each authorized claimant 230 and each unauthorized claimant 235 of the content item. In addition, the claim status 255 may identify unresolved mitigation actions. For example, if mitigation action notifies the content host 105 of an unauthorized claim to the content item and the content host 105 has not yet removed the claim of the unauthorized claimant 235, a pending status may be identified for the mitigation action.

In one embodiment, mitigation actions may be identified as potential, verified, approved, pending, complete, and failed. A potential mitigation action may be identified when an unauthorized claimant 235 is identified. In one embodiment, a verified mitigation actions may be when the system 100 is confirmed to be acting on behalf of an authorized claimant 230 and when the unauthorized claimant 235 is believed to have no legitimate interest in the content item.

An approved mitigation action may be when legal and business criteria for initiating the mitigation action are satisfied. In one embodiment, the mitigation action is approved by an administrator. Alternatively, the mitigation action may be approved by the mitigation policy 125.

A pending mitigation action may be when the content host 105 is notified. Alternatively, the pending mitigation action may be when the unauthorized claimant 235 is notified. In one embodiment, the mitigation action is pending when both the content host 105 and the unauthorized claimant 235 are notified.

The mitigation action may be complete when the unauthorized claim of the unauthorized claimant 235 is successfully removed from the content item on the content host 105. In addition, the mitigation action may be failed when the unauthorized claim of the unauthorized claimant 235 is not removed from the content item on the content host 105.

The view rank 260 may be calculated from the view statistics 225. The view rank 260 may be a ranking priority for the content item relative to the other content items in the content data 120. The calculation of the view rank 260 will be described hereafter.

Figure 3:
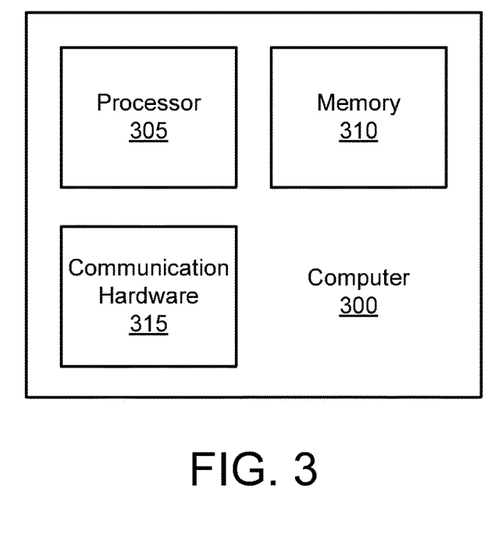
FIG. 3 is a schematic block diagram illustrating one embodiment of a computer.

FIG. 3 is a schematic block diagram illustrating one embodiment of a computer 300. The computer 300 may be a computer workstation, a server, a plurality of servers, a mainframe computer, or combinations thereof. The content management apparatus 110 may be embodied in the computer 300.

The computer 300 includes a processor 305, a memory 310, and communication hardware 315. The memory 310 may be a semiconductor storage device, a hard disk drive, an optical storage device, a micromechanical storage device, or combinations thereof. The memory 310 may store program code. The processor 305 may execute the program code. The communication hardware 315 may communicate with other devices and/or the network 115.

Figure 4:
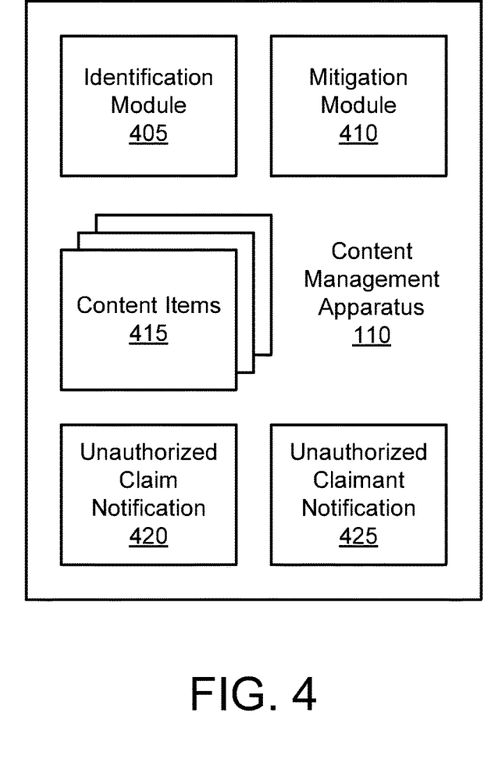
FIG. 4 is a schematic block diagram illustrating one embodiment of a content management apparatus.

FIG. 4 is a schematic block diagram illustrating one embodiment of the content management apparatus 110. The content management apparatus 110 may be embodied in the computer 300. The apparatus 110 includes an identification module 405 and a mitigation module 410. The identification module 405 and the mitigation module 410 may be embodied in a computer readable storage medium, such as the memory 310. The computer readable storage medium may store program code executable by the processor 305 to perform the functions of the apparatus 110. In addition, the apparatus 110 may include one or more content items 415, an unauthorized claim notification 420, and an unauthorized claimant notification 425.

The identification module 405 ranks the plurality of content in the content data 120 according to the value policy 130. In one embodiment, each content item 415 of the plurality of content is associated with at least one authorized claimant 230. The identification module 405 further identifies an unauthorized claim for content item 415 of the plurality of content by an unauthorized claimant 235. The mitigation module 410 may mitigate the unauthorized claim. The mitigation module 410 may mitigate the unauthorized claim with one or more of the unauthorized claim notification 420 and the unauthorized claimant notification 425.

Figure 5:
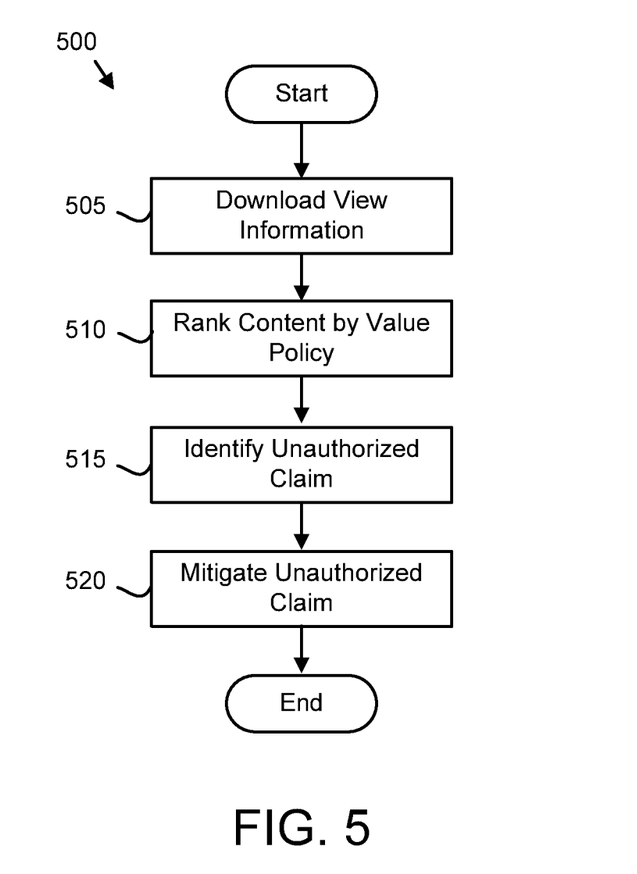
FIG. 5 is a schematic flow chart diagram illustrating one embodiment of a mitigation method.

FIG. 5 is a schematic flow chart diagram illustrating one embodiment of a mitigation method 500. The method 500 may perform the functions of the system 100 and the apparatus 110 by identifying unauthorized claims and mitigating the unauthorized claims. The method 500 may be performed using the processor 305. Alternatively, the method 500 may be performed by a program product. The program product may comprise a computer readable storage medium, such as the memory 310, storing program code. The processor 305 may execute the program code to perform the method 500.

The method 500 starts, and in one embodiment, the identification module 405 downloads 505 view information from the content host 105 for each content item 415 of the plurality of content. The view information may be recorded as the view statistics 225. The view information may include but is not limited to a number of views of the content item 415, revenue generated by the content item 415, search results returning the content item 415, and link data for the content item 415.

In one embodiment, the view information is downloaded 505 for content items 415 in the content data 120. Alternatively, the identification module 405 may search the content host 105 for content items 415 that match the content hash 245 and may download 505 the matching content items 415 and the content information for the matching content items 415.

In one embodiment, the identification module 405 ranks 510 the content items 415 of the content data 120 according to the value policy 130. In one embodiment, the value policy 130 specifies the content is ranked from a highest number of views to a lowest number of views. Alternatively, the value policy 130 may specify that content is ranked from a highest number of views for a most recent retrieval time interval to a lowest number of views for the most recent retrieval time interval.

In one embodiment, the value policy 130 specifies that the content is ranked from highest revenue to lowest revenue. Alternatively, the value policy 130 may specify the content is ranked from highest revenue during the most recent retrieval time interval to the lowest revenue during the most recent retrieval time interval.

The value policy 130 may also specify that the content is ranked from a highest number of inclusions in search results to a lowest number of inclusions in search results. In one embodiment, the value policy 130 specifies of the content is ranked from a highest number of inclusions in search results for the most recent retrieval time interval to a lowest number of inclusions in search results for the most recent retrieval time interval.

In addition, the value policy 130 may also specify that the content is ranked from a highest number of links to a lowest number of links. In a certain embodiment, the value policy 130 specifies of the content is ranked from a highest number of links during the most recent retrieval time interval to a lowest number of links during the most recent retrieval time interval.

In one embodiment, the view policy 130 specifies that the content is ranked by the view rank 260. The view rank 260 may be calculated for each content item. The view rank 260 may be calculated as a number of views, a number of views during a specified number of recent retrieval time intervals, revenue, revenue for a specified number of recent retrieval time intervals, inclusions in search results, inclusions in search results during a specified number of recent retrieval time intervals, a number of links, a number of links for a specified number of recent retrieval time intervals, or combinations thereof.

In one embodiment, the view rank VR 260 is calculated using Equation 1, where V is a number of views, R is revenue, I is inclusions in search results, L is a number of links, and k1, k2, k3, and k4 are nonzero constants.

$$VR = k1*V + k2*R + k3*I + k4*L$$

The identification module 405 may further identify 515 an unauthorized claim. The identification 515 of the unauthorized claim is explained in greater detail in the description of FIG. 6.

In one embodiment, the mitigation module 410 mitigates 520 the unauthorized claim and the method 500 ends. In one embodiment, the unauthorized claim is automatically mitigated according to the mitigation policy 120. The mitigation policy 125 may specify notifying the content host 105. Alternatively, the mitigation policy 125 may specify notifying the unauthorized claimant 235. The mitigation 520 of the unauthorized claim is explained in greater detail in the description of FIG. 7.

Figure 6:
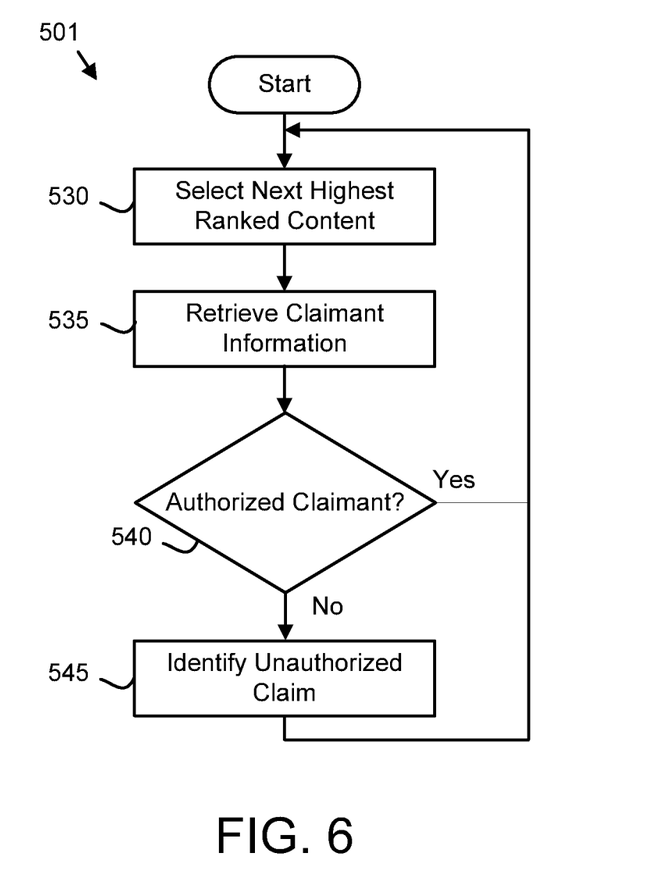
FIG. 6 is a schematic flow chart diagram illustrating one embodiment of an unauthorized claim identification method.

FIG. 6 is a schematic flow chart diagram illustrating one embodiment of an unauthorized claim identification method 501. The method 501 may identify an unauthorized claim for step 515 of the method 500 of FIG. 5. The method 501 may be performed using the processor 305. Alternatively, the method 501 may be performed by a program product. The program product may comprise a computer readable storage medium, such as the memory 310, storing program code. The processor 305 may execute the program code to perform the method 501.

The method 501 starts, and in one embodiment, the identification module 405 selects 530 a next highest ranked first content item 415. The content item 415 may be ranked using the view rank 260.

In one embodiment, the identification module 405 uses the content identifier 210 to retrieve 535 the claimant information for the first content item 415 from the content host 105. In one embodiment, the identification module 405 retrieves 535 the first content item 415 using the content identifier 210 and parses the claimant information from the first content item 415.

The identification module 405 further determines 540 if each claimant of the first content item 415 is an authorized claimants 230. If each claimant is an authorized claimant 230, the identification module 405 selects 530 the next highest ranked content item 415.

If a claimant of the first content item 415 is not an authorized claimant 230, the identification module 405 identifies 545 the claim as an unauthorized claim. In one embodiment, the identification module 405 records the claimant in the content entry 205 as unauthorized claimant 235. The identification module 405 may further record the claim in the claimant log 240.

The identification module 405 selects 530 the next highest ranked content item 415. The method 501 may continually identify 545 unauthorized claims for the plurality of content. Alternatively, the method 501 may identify 545 unauthorized claims until all content items 415 have been selected.

Figure 7:
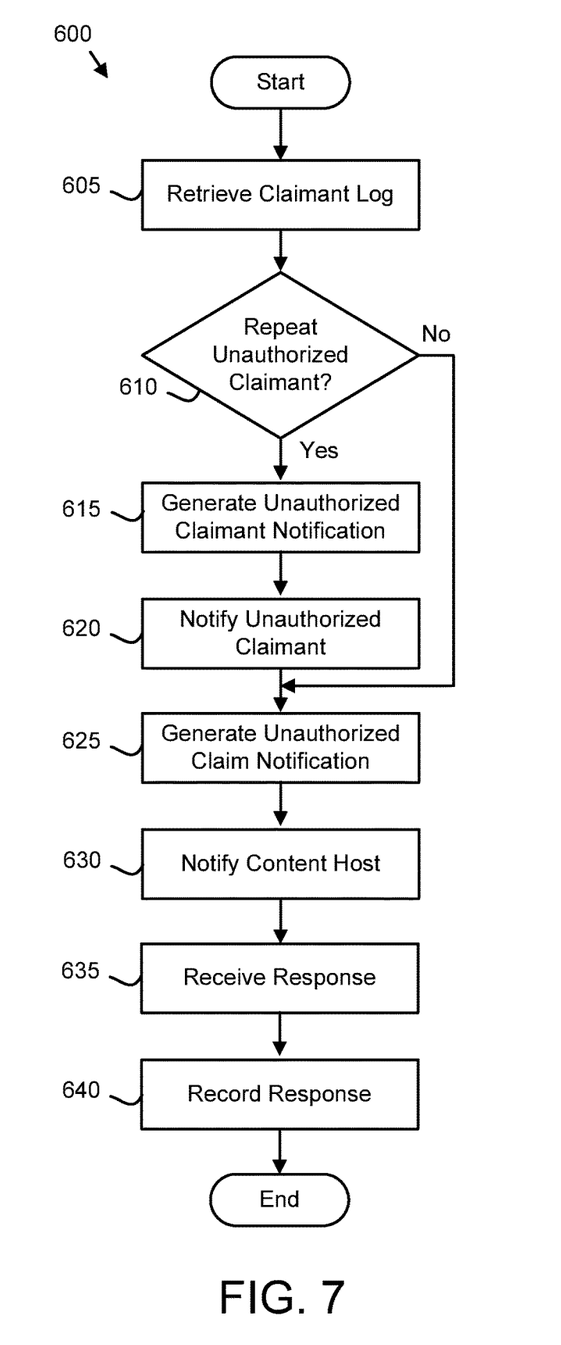
FIG. 7 is a schematic flow chart diagram illustrating one embodiment of an unauthorized claim mitigation method.

FIG. 7 is a schematic flow chart diagram illustrating one embodiment of an unauthorized claim mitigation method 600. The method 600 may perform the mitigate unauthorized claim step 520 of the method 500 of FIG. 5. The method 600 may be performed using the processor 305. Alternatively, the method 600 may be performed by a program product. The program product may comprise a computer readable storage medium, such as the memory 310, storing program code. The processor 305 may execute the program code to perform the method 600.

The method 600 starts, and in one embodiment, the mitigation module 410 retrieves 605 the claimant log 240 from the content entry 205. The mitigation module 410 may further determine 610 if an identified unauthorized claimant 235 is a repeat unauthorized claimant. The identified unauthorized claimant 235 may be a repeat unauthorized claimant if the identified unauthorized claimant 235 is listed in the claimant log 240 as having previously claimed the content item 415.

If the identified unauthorized claimant 235 is a repeat unauthorized claimant, the mitigation module 410 may generate 615 an unauthorized claimant notification 425. The unauthorized claimant notification 425 may be an email, a formal letter, or the like. The unauthorized claimant notification 425 may identify the content item and the content source 220. In one embodiment, the unauthorized claimant notification 425 includes the content identifier 210. The unauthorized claimant notification 425 may request actions to be taken by the unauthorized claimant 235, indicate actions that will be taken to mitigate the unauthorized claim, provide contact information for the authorized claimant 230, provide contact information for a content manager, and the like.

In one embodiment, the mitigation module 410 notifies 620 the unauthorized claimant 235 of the unauthorized claim. The mitigation module 410 may notify 620 the unauthorized claimant 235 by communicating the unauthorized claimant notification 425 to the unauthorized claimant 235. In one embodiment, the mitigation module 410 records the unauthorized claimant notification 425 and a time of notification 620 in the mitigation log 250.

If the identified unauthorized claimant 235 is not a repeat unauthorized claimant, the mitigation module 410 generates 625 the unauthorized claim notification 420. The unauthorized claimant notification 420 may be a form provided by the content host 105. Alternatively, the unauthorized claimant notification may be an application program interface (API) provided by the content host 105.

The mitigation module 410 may further notify 630 the content host 105. In one embodiment, the mitigation module 410 notifies 630 the content host 105 by communicating the unauthorized claim notification 420 to the content host 105. In one embodiment, the mitigation module 410 records the unauthorized claim notification 420 and the time of the notification 630 in the mitigation log 250 for the claim item 415.

In one embodiment, the mitigation module 410 receives 635 a response to the unauthorized claimant notification from the unauthorized claimant 235 and/or a response to the unauthorized claim notification from the content host 105. In one embodiment, the mitigation module 410 records 640 the response in the mitigation log 250 and the method 600 ends.

Figure 8:
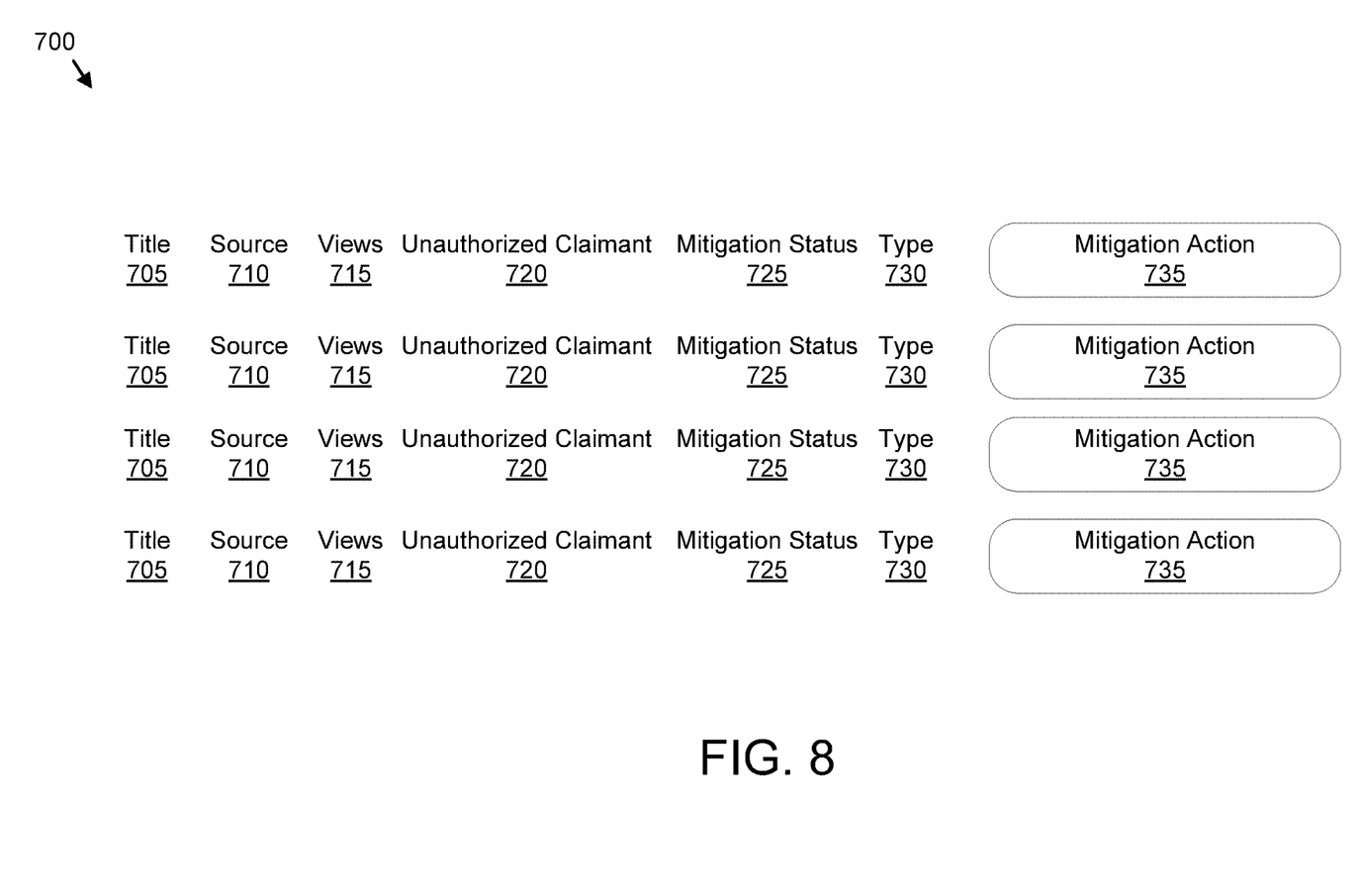
FIG. 8 is a schematic block diagram illustrating one embodiment of providing unauthorized claims.

FIG. 8 is a schematic block diagram illustrating one embodiment of providing unauthorized claims 800. The unauthorized claims 800 may be provided as a data display. In the depicted embodiment, a title 705, a source 710, views 715, unauthorized claimants 720, a mitigation status 725, a type 730, and a mitigation action 735 are displayed for each content item 415.

The title 705 may be the content title 215. Alternatively, the content title 705 may be an abbreviated content title 215. In one embodiment, the content title 705 is provided by an authorized claimant 230 and/or is distinct from the content title 215.

The source 710 may be the content source 220. In one embodiment, the content host 105 is not displayed. The views 715 may comprise one or more of the view statistics 225. The unauthorized claimant 720 may display the unauthorized claimant 235. In one embodiment, repeat unauthorized claimants are indicated. For example, a number of repeat claims may be indicated. The mitigation status 725 may display the claim status 255. In one embodiment, the type 730 indicates the type of the content item. The type 730 may specify a video, a music video, a movie trailer, an audio segment, or the like.

In one embodiment, the mitigation action 735 is a selectable icon. In one embodiment, the icon becomes selectable when a mitigation action for the content item has a potential status. Alternatively, the icon may become selectable when the mitigation action for the content item has a verified status. Selecting the icon may approve and initiate the mitigation action 735.

In one embodiment, the identification module 405 automatically determines that the mitigation action is potential and verified. In addition, the mitigation module 410 may automatically approve and initiate the mitigation action 735

By ranking a plurality of content according to the value policy 130, the content items with the highest potential value are most easily and first accessible. In addition, the content items with the highest potential value are most often checked for unauthorized claims, allowing those unauthorized claims to be expeditiously mitigated.

Thus the embodiments automate and streamline the identification of unauthorized claims in the mitigation of those unauthorized claims. As a result, owners and managers of content can quickly remove unauthorized claims, resulting in more revenue and other benefits for the owners.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

searching, by use of a processor, a content host for a plurality of content that matches a content hash;

downloading the plurality of content that matches the content hash and view information for each content item of the plurality of content, wherein the view information comprises a number of views, a number of views during a specified number of recent retrieval time intervals, revenue, revenue for a specified number of recent retrieval time intervals, inclusions in search results, inclusions in search results during a specified number of recent retrieval time intervals, a number of links, and a number of links for a specified number of recent retrieval time intervals for each content item;

automatically calculating a view rank for each content item of the plurality of content as a function of the view information;

ranking the plurality of content according to the view rank, wherein each content item of the plurality of content is associated with at least one authorized claimant and the plurality of content is provided through the content host;

selecting a highest ranked content item;

identifying an unauthorized claim for the selected content item by an unauthorized claimant by retrieving claimant information for the selected content item from the content host, determining the selected content item is from an authorized claimant in response to a content entry associated with the selected content item including the authorized claimant with proofs of a legitimate claim to the selected content item, and determining that the content item is from unauthorized claimant if there is no content entry with the proofs of the legitimate claim to the selected content item associated with the unauthorized claimant;

retrieving a claimant log of unauthorized claimants to the selected content item, wherein the claimant log records an identifier for each unauthorized claimant of the selected content item, a time of an unauthorized claim, and a status of the unauthorized claim;

in response to the unauthorized claimant being listed in the claimant log, determining the unauthorized claimant is a repeat unauthorized claimant;

in response to determining the unauthorized claimant is the repeat unauthorized claimant, automatically generating an unauthorized claimant notification and communicating the unauthorized claimant notification to the unauthorized claimant; and in response to identifying the unauthorized claim, automatically generating an unauthorized claim notification and communicating the unauthorized claim notification to the content host, wherein the content item with the unauthorized claim is removed from the content host resulting in more revenue and benefits for the authorized claimant of the content item.

2. The method of claim 1, the method further comprising:
receiving a response to the unauthorized claim notification; and
recording the response.

3. The method of claim 1, the method further comprising:
receiving a response to the unauthorized claimant notification; and
recording the response.

4. The method of claim 1, wherein each content item of the plurality of content comprises a content entry, each content entry comprising a content identifier, a content title, a content source, view statistics, an authorized claimant, the unauthorized claimant, a claimant log, a content hash, a mitigation log, a mitigation status, and a view rank.

5. An apparatus comprising:
a processor;
a non-transitory computer readable storage medium storing computer readable code executable by the processor to perform:
searching a content host for a plurality of content that matches a content hash;
downloading the plurality of content that matches the content hash and view information for each content item of the plurality of content, wherein the view information comprises a number of views, a number of views during a specified number of recent retrieval time intervals, revenue, revenue for a specified number of recent retrieval time intervals, inclusions in search results, inclusions in search results during a specified number of recent retrieval time intervals, a number of links, and a number of links for a specified number of recent retrieval time intervals for each content item;
automatically calculating a view rank for each content item of the plurality of content as a function of the view information;
ranking the plurality of content according to the view rank, wherein each content item of the plurality of content is associated with at least one authorized claimant and the plurality of content is provided through the content host;
selecting a highest ranked content item;
identifying an unauthorized claim for the selected content item by an unauthorized claimant by retrieving claimant information for the selected content item from the content host, determining the selected content item is from an authorized claimant in response to a content entry associated with the selected content item including the authorized claimant with proofs of a legitimate claim to the selected content item, and determining that the content item is from unauthorized claimant if there is no content entry with the proofs of the legitimate claim to the selected content item associated with the unauthorized claimant;
retrieving a claimant log of unauthorized claimants to the selected content item, wherein the claimant log records an identifier for each unauthorized claimant of the selected content item, a time of an unauthorized claim, and a status of the unauthorized claim;
in response to the unauthorized claimant being listed in the claimant log, determining the unauthorized claimant is a repeat unauthorized claimant;
in response to determining the unauthorized claimant is the repeat unauthorized claimant, automatically generating an unauthorized claimant notification and communicating the unauthorized claimant notification to the unauthorized claimant; and in response to identifying the unauthorized claim, automatically generating an unauthorized claim notification and communicating the unauthorized claim notification to the content host, wherein the content item with the unauthorized claim is removed from the content host resulting in more revenue and benefits for the authorized claimant of the content item.

6. The apparatus of claim 5, wherein the processor further performs:
receiving a response to the unauthorized claim notification; and
recording the response.

7. The apparatus of claim 5, wherein the processor further performs:
receiving a response to the unauthorized claimant notification; and
recording the response.

8. The apparatus of claim 5, wherein each content item of the plurality of content comprises a content entry, each content entry comprising a content identifier, a content title, a content source, view statistics, an authorized claimant, the unauthorized claimant, a claimant log, a content hash, a mitigation log, a mitigation status, and a view rank.

9. A program product comprising a non-transitory computer readable storage medium storing computer readable code executable by a processor to perform:
searching a content host for a plurality of content that matches a content hash;
downloading the plurality of content that matches the content hash and view information for each content item of the plurality of content, wherein the view information comprises a number of views, a number of views during a specified number of recent retrieval time intervals, revenue, revenue for a specified number of recent retrieval time intervals, inclusions in search results, inclusions in search results during a specified number of recent retrieval time intervals, a number of links, and a number of links for a specified number of recent retrieval time intervals for each content item;
automatically calculating a view rank for each content item of the plurality of content as a function of the view information;
ranking the plurality of content according to the view rank, wherein each content item of the plurality of content is associated with at least one authorized claimant and the plurality of content is provided through the content host;
selecting a highest ranked content item;
identifying an unauthorized claim for the selected content item by an unauthorized claimant by retrieving claimant information for the selected content item from the content host, determining the selected content item is from an authorized claimant in response to a content entry associated with the selected content item including the authorized claimant with proofs of a legitimate claim to the selected content item, and determining that the content item is from unauthorized claimant if there is no content entry with the proofs of the legitimate claim to the selected content item associated with the unauthorized claimant;
retrieving a claimant log of unauthorized claimants to the selected content item, wherein the claimant log records an identifier for each unauthorized claimant of the selected content item, a time of an unauthorized claim, and a status of the unauthorized claim;

in response to the unauthorized claimant being listed in the claimant log, determining the unauthorized claimant is a repeat unauthorized claimant;

in response to determining the unauthorized claimant is the repeat unauthorized claimant, automatically generating an unauthorized claimant notification and communicating the unauthorized claimant notification to the unauthorized claimant; and in response to identifying the unauthorized claim, automatically generating an unauthorized claim notification and communicating the unauthorized claim notification to the content host, wherein the content item with the unauthorized claim is removed from the content host resulting in more revenue and benefits for the authorized claimant of the content item.

10. The program product of claim 9, the processor further performing:

receiving a response to the unauthorized claim notification; and recording the response.

* * * * *